(12) United States Patent
Park et al.

(10) Patent No.: US 11,761,623 B2
(45) Date of Patent: Sep. 19, 2023

(54) APPARATUS FOR COMBUSTION OPTIMIZATION AND METHOD THEREFOR

(71) Applicant: DOOSAN ENERBILITY CO., LTD, Changwon-si (KR)

(72) Inventors: Jee Hun Park, Gwangmyeong-si (KR); Sang Gun Na, Yongin-si (KR); Hyun Sik Kim, Gyeonggi-do (KR); Jwa Young Maeng, Yongin-si (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 989 days.

(21) Appl. No.: 16/574,087

(22) Filed: Sep. 18, 2019

(65) Prior Publication Data

US 2020/0166206 A1 May 28, 2020

(30) Foreign Application Priority Data

Nov. 26, 2018 (KR) .................. 10-2018-0147789

(51) Int. Cl.
*F22B 35/18* (2006.01)
*G05B 13/04* (2006.01)
*F23N 5/26* (2006.01)

(52) U.S. Cl.
CPC ............ *F22B 35/18* (2013.01); *G05B 13/042* (2013.01); *F23N 5/265* (2013.01); *F23N 2223/40* (2020.01)

(58) Field of Classification Search
None
See application file for complete search history.

(56) References Cited

U.S. PATENT DOCUMENTS

| 7,813,819 | B2 * | 10/2010 | Yamada | ............. G05B 13/0265 700/47 |
| 2003/0140023 | A1 * | 7/2003 | Ferguson | ............... G06Q 30/02 706/15 |

(Continued)

FOREIGN PATENT DOCUMENTS

| CN | 104750066 A | | 7/2015 |
| CN | 105790866 A | * | 7/2016 |

(Continued)

OTHER PUBLICATIONS

The CN Office Action, dated Mar. 15, 2023.

*Primary Examiner* — Mohammad Ali
*Assistant Examiner* — David Earl Ogg
(74) *Attorney, Agent, or Firm* — Harvest IP Law, LLP

(57) ABSTRACT

An apparatus for combustion optimization is provided. The apparatus for combustion optimization includes a management layer configured to collect currently measured real-time data for boiler combustion, and to determine whether to perform combustion optimization and whether to tune a combustion model and a combustion controller by analyzing the collected real-time data, a data layer configured to derive learning data necessary for designing the combustion model and the combustion controller from the real-time data and previously measured past data for the boiler combustion, a model layer configured to generate the combustion model and the combustion controller through the learning data, and an optimal layer configured to calculate a target value for the combustion optimization by using the combustion model and the combustion controller, and to output a control signal according to the calculated target value.

17 Claims, 3 Drawing Sheets

(56) References Cited

U.S. PATENT DOCUMENTS

| | | | | |
|---|---|---|---|---|
| 2003/0140039 | A1* | 7/2003 | Ferguson | G06K 9/00503 |
| 2007/0184556 | A1* | 8/2007 | Wang | F22B 33/18 |
| | | | | 436/143 |
| 2007/0240648 | A1* | 10/2007 | Badami | F01K 13/02 |
| | | | | 122/504 |
| 2011/0093182 | A1 | 4/2011 | Weber et al. | |
| 2011/0172897 | A1 | 7/2011 | Tsuzuki | |
| 2012/0143382 | A1 | 6/2012 | Lou | |
| 2016/0091203 | A1* | 3/2016 | Wang | F23N 1/022 |
| | | | | 700/274 |
| 2018/0024508 | A1* | 1/2018 | Piche | G06F 17/11 |
| | | | | 706/23 |
| 2019/0292898 | A1* | 9/2019 | Quattrone | E21B 44/04 |

FOREIGN PATENT DOCUMENTS

| | | |
|---|---|---|
| CN | 106873377 A | 6/2017 |
| CN | 107314671 A | 11/2017 |
| DE | 102007061604 A1 | 6/2009 |
| JP | 2009-198136 A | 9/2009 |
| JP | 2013-178045 A | 9/2013 |
| KR | 10-1041467 B1 | 6/2011 |
| KR | 101810968 B1 | 12/2017 |

\* cited by examiner

APPARATUS FOR COMBUSTION OPTIMIZATION AND METHOD THEREFOR

CROSS-REFERENCE TO RELATED APPLICATION

This application claims priority to Korean Patent Application No. 10-2018-0147789, filed on Nov. 26, 2018, the disclosure of which is incorporated by reference herein in its entirety.

BACKGROUND

Field

Apparatuses and methods consistent with exemplary embodiments relate to an optimization technology, and more particularly, to an apparatus for combustion optimization of a boiler and a method therefor.

Description of the Related Art

A boiler of a coal-fired power plant heats water by using the exothermic reaction that occurs during coal combustion and produces steam required for power generation. At this time, contaminated exhaust gas such as nitrogen oxide is generated, and if the amount of generated gas is large, the treatment cost increases to manage it, and in case of incomplete combustion, combustion efficiency reduces and the power generation/operation cost increases. Accordingly, it is necessary to develop a technique for reducing the exhaust gas while increasing the combustion efficiency.

SUMMARY

Aspects of one or more exemplary embodiments provide an apparatus for combustion optimization capable of reducing an exhaust gas even while increasing combustion efficiency and a method therefor.

Additional aspects will be set forth in part in the description which follows and, in part, will become apparent from the description, or may be learned by practice of the exemplary embodiments.

According to an aspect of an exemplary embodiment, there is provided an apparatus for combustion optimization of a boiler including: a management layer configured to collect currently measured real-time data for boiler combustion, and to determine whether to perform combustion optimization and whether to tune a combustion model and a combustion controller by analyzing the collected real-time data, a data layer configured to derive learning data necessary for designing the combustion model and the combustion controller from the real-time data and previously measured past data for the boiler combustion, a model layer configured to generate the combustion model and the combustion controller through the learning data, and an optimal layer configured to calculate a target value for the combustion optimization by using the combustion model and the combustion controller, and to output a control signal according to the calculated target value.

The management layer may include a combustion management configured to collect the real-time data, and to determine whether to perform the combustion optimization by analyzing the collected real-time data, and an auto-tuning management configured to determine whether to tune the combustion model and the combustion controller based on the analysis result.

The data layer may include a data pre-processor configured to perform pre-processing for data including the real-time data and the past data, and a data analyzer configured to derive the learning data necessary for designing the combustion model and the combustion controller by analyzing the pre-processed data.

The data pre-processor may perform at least one of a signal restoration that restores missing data, a filtering that filters data satisfying a predetermined condition based on base knowledge or data, and an outlier processing that erases data that exceeds an upper limit value or falls below a lower limit value.

The model layer may include a combustion model design algorithm configured to generate the combustion model based on the learning data, and a combustion controller design algorithm configured to generate the combustion controller based on the learning data.

The optimal layer may include an optimal model/controller selector configured to select the combustion model and the combustion controller that best match according to a predetermined rule among a plurality of combustion models and combustion controllers by analyzing the real-time data, and a control optimization algorithm configured to derive a control target value through the selected combustion model and combustion controller.

The optimal model/controller selector may select the combustion model having the smallest difference between the currently measured real-time data for the boiler combustion and estimation data estimated through the combustion model among the plurality of combustion models.

According to an aspect of another exemplary embodiment, there is provided an apparatus for combustion optimization of a boiler including: a data layer configured to derive learning data necessary for designing a combustion model and a combustion controller from currently measured real-time data for boiler combustion and previously measured past data for the boiler combustion, a model layer configured to generate the combustion model and the combustion controller through the learning data, and an optimal layer configured to select any one combustion model among a plurality of combustion models by analyzing the real-time data, to calculate a target value for the combustion optimization by using the selected combustion controller after selecting any one combustion controller among a plurality of combustion controllers based on the selected combustion model, and to output a control signal according to the calculated target value.

The data layer may include a data pre-processor configured to pre-process data including the real-time data and the past data, and a data analyzer configured to derive the learning data necessary for designing the combustion model and the combustion controller by analyzing the pre-processed data.

The data pre-processor may perform at least one of a signal restoration that restores missing data, a filtering that filters data satisfying a predetermined condition based on base knowledge or data, and an outlier processing that erases data that exceeds an upper limit value or falls below a lower limit value.

The model layer may include a combustion model design algorithm configured to generate the combustion model based on the learning data, and a combustion controller design algorithm configured to generate the combustion controller based on the learning data.

The optimal layer may include an optimal model/controller selector configured to select the combustion model and the combustion controller that best match according to a predetermined rule among a plurality of combustion models and combustion controllers by analyzing the real-time data, and a combustion optimization algorithm configured to derive a control target value through the selected combustion model and combustion controller.

The optimal model/controller selector may select the combustion model having the smallest difference between the currently measured real-time data for the boiler combustion and estimation data estimated through the combustion model among the plurality of combustion models.

According to an aspect of still another exemplary embodiment, there is provided a method for optimizing combustion including: collecting, by a management layer, currently measured real-time data for boiler combustion, and determining whether to tune a combustion model and a combustion controller by analyzing the collected real-time data, deriving, by a data layer, learning data from the real-time data and previously measured past data for the boiler combustion in response to determining that the management layer determines to tune, generating, by a model layer, the combustion model and the combustion controller by using the learning data, calculating, by an optimal layer, a target value for combustion optimization through the selected combustion model and combustion controller among a plurality of combustion models and combustion controllers including the generated combustion model and combustion controller, and outputting, by the optimal layer, a control signal according to the calculated target value.

The deriving the learning data may include pre-processing, by a data pre-processor of the data layer, data including the real-time data and the previously measured past data, and deriving, by a data analyzer of the data layer, the learning data necessary for designing the combustion model and the combustion controller by analyzing the pre-processed data.

The pre-processing may include performing, by the data pre-processor, at least one of a signal restoration that restores missing data, a filtering that filters data satisfying a predetermined condition based on base knowledge or data, and an outlier processing that erases data that exceeds an upper limit value or falls below a lower limit value.

The generating the combustion model and the combustion controller may include generating, by a combustion model design algorithm of the model layer, the combustion model based on the learning data, and generating, by a combustion controller design algorithm of the model layer, the combustion controller based on the learning data.

The calculating the target value for the combustion optimization may include selecting, by an optimal model/controller selector of the optimal layer, the combustion model by analyzing the real-time data, selecting, by the optimal model/controller selector, the combustion controller based on the selected combustion model, and deriving, by a combustion optimization algorithm of the optimal layer, a control target value through the selected combustion model and the selected combustion controller.

The selecting the combustion model may include selecting, by the optimal model/controller selector, the combustion model having the smallest difference between the currently measured real-time data for the boiler combustion and estimation data estimated through the combustion model among the plurality of combustion models.

The method for optimizing combustion may further include, after the determining whether to tune, in response to determining that the management layer determines not to tune, calculating, by the optimal layer, the target value for the combustion optimization through the combustion model and the combustion controller selected from the plurality of combustion models and combustion controllers previously stored, and outputting, by the optimal layer, the control signal according to the calculated target value.

As described above, according to one or more exemplary embodiments, it is possible to reduce the exhaust gas even while maximally maintaining the combustion efficiency through the combustion optimization.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
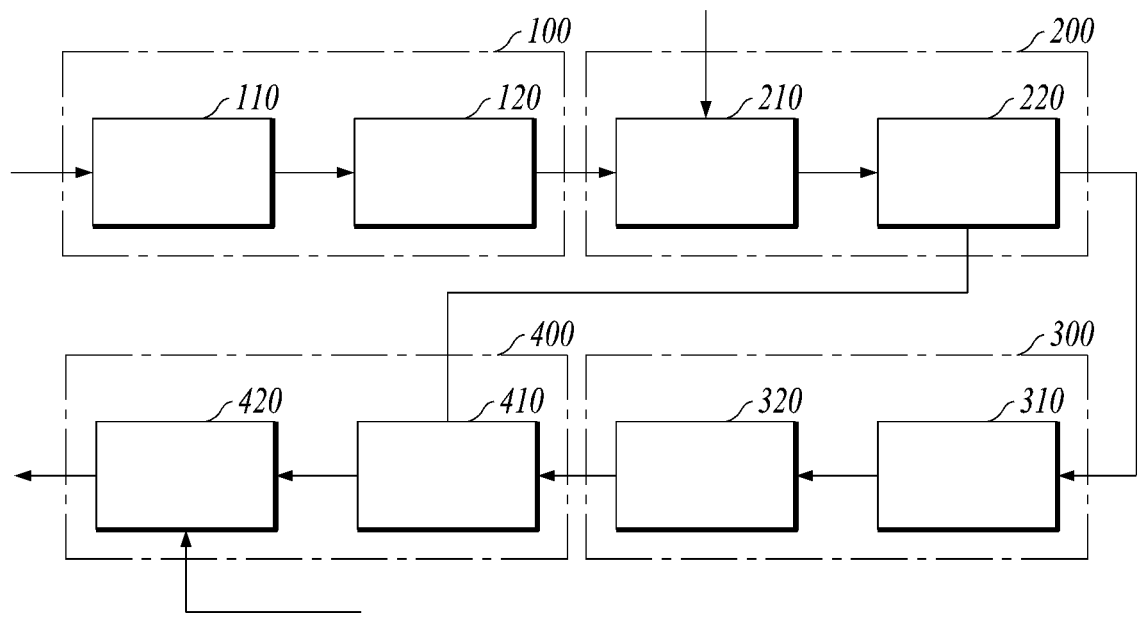
FIG. 1 is a block diagram for explaining a configuration of an apparatus for combustion optimization according to an exemplary embodiment.

Hereinafter, various modifications and various embodiments will be described in detail with reference to the accompanying drawings so that those skilled in the art may easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein. In order to clearly illustrate the disclosure in the drawings, some of the elements that are not essential to the complete understanding of the disclosure may be omitted, and like reference numerals refer to like elements throughout the specification.

The terminology used in the disclosure is for the purpose of describing specific embodiments only and is not intended to limit the scope of the disclosure. The singular expressions "a", "an", and "the" are intended to include the plural expressions as well unless the context clearly indicates otherwise. In the disclosure, terms such as "comprises," "includes," or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Also, "a module" or "a part" in the disclosure perform at least one function or operation, and these elements may be implemented as hardware or software, or as a combination of hardware and software. Further, a plurality of "modules" or "parts" may be integrated into at least one module and implemented as at least one processor, except "modules" or "parts" that need to be implemented as specific hardware.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

FIG. 1 is a block diagram for explaining a configuration of an apparatus for combustion optimization according to an exemplary embodiment.

Referring to FIG. 1, a combustion optimization apparatus 10 according to an exemplary embodiment may include a management layer 100, a data layer 200, a model layer 300, and an optimal layer 400.

The management layer 100 is configured to manage combustion optimization, a combustion model, and a combustion controller by collecting currently measured real-time data for boiler combustion, and analyzing the collected real-time data. That is, the management layer 100 manages whether to perform the combustion optimization and whether to tune the combustion model and the combustion controller by analyzing the measured data. The management layer 100 may include a combustion management 110 and an auto-tuning management (model/controller) 120.

The combustion management 110 is configured to manage combustion optimization. A boiler system includes a boiler and a combustion controller for controlling the combustion of the boiler. The combustion management 110 determines whether to perform the combustion optimization based on real-time data which is measured in real time from the boiler system. Here, the real-time data includes operation data and a state binary value of the boiler. The operation data includes a value measured through a plurality of sensors with respect to the boiler, and a control value for controlling the boiler. The state binary value is a flag value indicating whether a change in a state of a parameter related to the boiler is out of a predetermined range. Here, the state binary value is data indicating a degree of change of the state, such as a variation of the output of the boiler, a variation of the fuel amount used, a variation of the fuel supply amount, a variation of the water supply amount, a variation of the combustion air supply amount, a variation of the coal supply amount, whether to operate a soot blower, or whether to operate boiler protection logic. For example, if the combustion air supply amount fluctuates within a predetermined range from the current value, the state binary value of the combustion air supply amount maintains "0", but if the combustion air supply amount changes by exceeding the predetermined range from the current value, the state binary value may be changed to "1".

The auto-tuning management (model/controller) 120 is configured to manage the combustion model and the combustion controller. The auto-tuning management (model/controller) 120 determines whether to tune the combustion model and the combustion controller based on the real-time data measured in real time and whether to perform the combustion optimization. Here, only when the auto-tuning management (model/controller) 120 determines to perform tuning, a combustion model design algorithm 310 and a combustion controller design algorithm 320 operate. However, when the auto-tuning management (model/controller) 120 determines not to perform tuning, the combustion model design algorithm 310 and the combustion controller design algorithm 320 do not operate. The data layer 200 is configured to pre-process and sort data to generate learning data necessary for a design of the combustion model and the combustion controller. That is, the data layer 200 extracts the learning data necessary for the design of the combustion model and the combustion controller from the currently measured real-time data for the boiler combustion, and the past data previously measured and stored for the boiler combustion. The data layer 200 may include a data pre-processor 210 and a data analyzer 220.

The data pre-processor 210 pre-processes data including real-time data and past data. The data pre-processor 210 performs at least one pre-processing of signal restoration, filtering, and outlier processing. Here, the signal restoration means restoring missing data. The filtering means filtering data suitable for the condition based on base knowledge or data. The outlier processing means an operation of erasing data that exceeds an upper limit value or falls below a lower limit value. This pre-processing may remove noise in the data or remove data that may adversely affect in designing or tuning the combustion model and the combustion controller in advance.

The data analyzer 220 derives learning data by analyzing the pre-processed data. The data analyzer 220 analyzes a correlation between the data based on a tag of the data, clusters the data, and selects input data whose correlation degree is a predetermined value or more for model output data through the correlation analysis for the design of the combustion model. Accordingly, the input data and the target data corresponding thereto may be derived. Further, the data analyzer 220 performs sampling for sorting the data in the steady state necessary for the design of the combustion model and the combustion controller through a pattern analysis of the data.

The model layer 300 is configured to generate the combustion model and the combustion controller based on the learning data. The model layer 300 may include the combustion model design algorithm 310 and the combustion controller design algorithm 320.

The combustion model design algorithm 310 designs the combustion model, which is one of the most important factors for optimizing the boiler combustion. The combustion model design algorithm 310 generates the combustion model based on the learning data. That is, the combustion model design algorithm 310 constitutes the combustion model for outputting predictive data predicting factors such as the power generation output, the combustion state including the temperature of the steam and the exhaust gas, the composition of the exhaust gas (e.g., carbon monoxide, nitrogen oxide), and the residual oxygen amount after the combustion, which are important variables for combustion based on the input data including the real-time data and the past data such as fuel input amount, air input amount, water input amount, and air temperature.

The combustion model according to an exemplary embodiment is generated based on at least one of a plurality of parametric models including a transfer function model and a state space model and a plurality of nonparametric models. Table 1 below shows an example of the parametric model and the non-parametric model according to an exemplary embodiment.

TABLE 1

| Parametric Model | Transfer Function | Equation Error | Auto-Regressive eXogeneous (ARX) |
| --- | --- | --- | --- |
| | | | Nonlinear Auto-Regressive eXogeneous (NARX) |
| | | | Finite Impulse Response (FIR) |
| | | | Auto-Regressive Moving Average eXogenious (ARMAX): Pseudolinear Regression Model |
| | | | Auto-Regressive (AR) |
| | | | Auto-Regressive Moving Average (ARMA) |
| | | | Auto-Regressive Auto-Regressive eXogeneous (ARARX): Generalized Least-Squares Model |
| | | | Auto-Regressive Auto-Regressive Moving Average eXogeneous (ARARMAX): Extended Matrix Model |
| | | Output Error | Output Error (OE) |
| | | | Box and Jenkins (BJ) |

TABLE 1-continued

| | |
|---|---|
| State Space | Linear Time Invariant (LTI), Linear Time Variant (LTV)<br>Linear Model, Nonlinear Model<br>Continuous Time, Discrete Time, Delay Time<br>Single Input Single Output (SISO), Multi Input Multi Output (MIMO)<br>Stochastic Model, Deterministic Model<br>Robust, Open Loop, Closed Loop |
| Non Parametric Model | Non Parametric (Data Set Type)<br>Impulse Response<br>Step Response<br>Frequency Transfer Function<br>Tree<br>Neural Network (NN): FF, FB, Radial Basis Function, Convolutional, Spiking, Deep NN (Deep Belief Network), Recurrent NN |

Further, the combustion model may be derived by using at least one of the optimization algorithms listed in Table 2 below.

TABLE 2

| | |
|---|---|
| Parametric Model | Prediction Error Method (PEM)<br>Maximum Likelihood Method (MLM)<br>Least-Squares Method (LSM)<br>Batch Least-Squares Method<br>Off-line Least-Squares Method<br>Extended Least-Squares Method (ELSM)<br>Generalized Least-Squares Method (GLSM)<br>Recursive Least-Squares Method (RLS)<br>Instrumental Variable Method (IVM)<br>Principle Component Analysis (PCA)<br>Dynamic Principle Component Analysis (DPCA)<br>Partial Least Squares (PLS)<br>SubSpace-based State Space Model Identification (4SID) Method<br>(+Singular Value Decomposition (SVD))<br>(+QR Decomposition)<br>N4SID Method<br>Multivariable Output Error State sPace (MOESP) Method<br>Canonical VariateAnalysis (CVA)<br>Singular Value Decomposition<br>Minimal Realization Method (MRM) |
| Non Parametric Model | Transient Response Method<br>Correlation Analysis<br>Frequency Response Method<br>Spectral Analysis Method<br>Empirical Transfer Function Estimate (ETFE) Method<br>Single/Multi-Layer Perceptron Learning,<br>Back-Propagation, Gradient Descent<br>LayerwisePretraining: Auto-Encoder, BolzmannMachine |

The combustion controller design algorithm 320 designs the combustion controller, which is one of the most important factors for optimizing the boiler combustion based on the learning data. The designed combustion controller serves to produce the optimal target value for optimal combustion control. At this time, the combustion model is used to produce the optimal target value. The combustion controller derives the predictive data based on the input data including the real-time data and the past data through the combustion model, and derives the optimal target value with reference to the derived predictive data.

The optimal layer 400 is configured to select the optimal combustion model and combustion controller, and calculate the optimal target value for combustion optimization by using the selected combustion model and combustion controller. The optimal layer 400 may include an optimal model/controller selector 410 and a combustion optimization algorithm 420.

The optimal model/controller selector 410 is used to select the most optimal combustion model and combustion controller among a plurality of combustion models and combustion controllers that have been previously produced based on the analysis results of real-time data.

The optimal model/controller selector 410 analyzes the real-time data and the past data. Here, the analysis includes 1) base knowledge-based data analysis and 2) data-based analysis. As a result of the data analysis, information on a pattern of real-time data, a change in power generation output, an efficiency condition, and a driving condition may be derived. The optimal model/controller selector 410 selects an optimal combustion model to be used for the combustion control based on the information derived according to the result of the data analysis described above. Further, the optimal model/controller selector 410 selects an optimal combustion controller for the combustion optimization by using the result of the data analysis and the combustion model.

The combustion optimization algorithm 420 calculates the optimal target value for the combustion optimization by inputting the real-time data to the combustion model and combustion controller selected by the optimal model/controller selector 410. Thereafter, an optimal control target value or an auxiliary value associated therewith is calculated by using set points and the manual bias in the current DCS.

Figure 2:
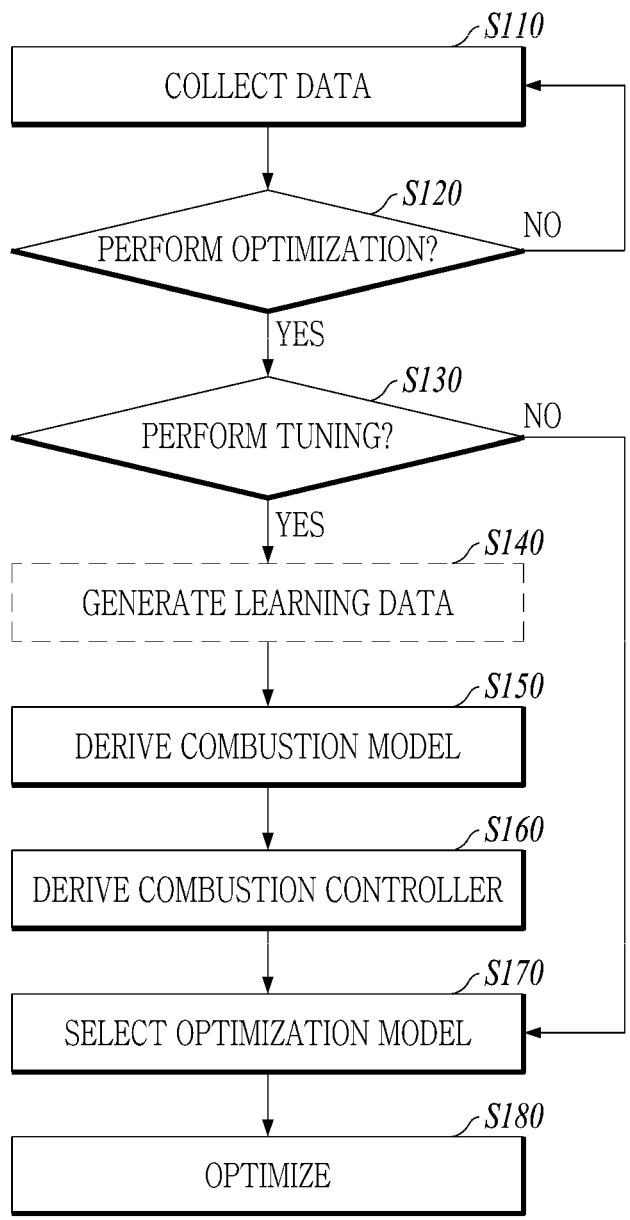
FIG. 2 is a flowchart for explaining a method for optimizing combustion according to an exemplary embodiment.

FIG. 2 is a flowchart for explaining a method for optimizing combustion according to an exemplary embodiment.

Referring to FIG. 2, the combustion management 110 of the management layer 100 collects currently measured real-time data for the boiler combustion of a power plant (operation S110). This real-time data includes operation data and a state binary value of the boiler.

The operation data includes a value measured through a plurality of sensors with respect to the boiler, and a control value for controlling the boiler. The state binary value is a flag value indicating whether a change in a state of a parameter related to the boiler is out of a predetermined range. At this time, the state binary value is data indicating a degree of change of the state, such as a variation of output of the boiler, a variation of fuel amount used, a variation of the fuel supply amount, a variation of the water supply amount, a variation of the combustion air supply amount, a variation of the coal supply amount, whether to operate a soot blower, and whether to operate boiler protection logic. For example, if the combustion air supply amount fluctuates within a predetermined range from the current value, the state binary value of the combustion air supply amount maintains "0", but if the combustion air supply amount changes by exceeding the predetermined range from the current value, the state binary value may be changed to "1".

The combustion management 110 determines whether to perform the optimization according to a predetermined condition based on the collected data (operation S120). At this time, the combustion management 110 may determine whether to perform the optimization through the operation data-based analysis, the state binary value-based analysis, and the analysis reflecting the knowledge and experience of the expert. For example, according to the analysis reflecting the knowledge and experience of the expert, it is possible to determine whether to perform the optimization according to whether the range of specific operation data such as NOx, CO, and Unit Load Demand and a value according to an influence between the data are normal. The combustion management 110 may derive whether the optimization control of the boiler is applicable and whether the combustion optimization may be performed, and determine to perform the optimization when two values are true.

If it is determined to perform the optimization in operation S120, the auto-tuning management (model/controller) 120 of the management layer 100 determines whether to tune the combustion model and the combustion controller based on at least one of the real-time data, whether to perform the combustion optimization and whether to perform learning for the tuning of the combustion model and the combustion controller (operation S130).

If it is determined to perform the tuning in operation S130, the data layer 200 generates the learning data necessary for the design of the combustion model and the combustion controller by pre-processing and sorting the currently measured real-time data and the past data previously measured (operation S140). The data pre-processor 210 of the data layer 200 performs the pre-processing for the currently measured real-time data and the previously measured past data (operation S140). At this time, the data pre-processor 210 may perform at least one of signal restoration for restoring missing data, filtering for filtering the data satisfying a predetermined condition based on base knowledge or data, and outlier processing for erasing the data exceeding an upper limit value or falling below a lower limit value by pre-processing. Accordingly, the data, etc. that may adversely affect in removing the noise in the tag data or designing the combustion model and the combustion controller are erased in advance. Further, the data analyzer 220 of the data layer 200 performs the sampling of sorting only the important data of the steady state necessary for designing the combustion model and the combustion controller through the pattern analysis of the data, and selects input variables whose correlation degree is a predetermined value or more for the output variables of the combustion model and the combustion controller through the correlation analysis, etc. for designing the combustion model (operation S140). That is, the data analyzer 220 generates the learning data through the sampling and the input variable selection.

Next, the combustion model design algorithm 310 of the model layer 300 generates the combustion model based on the learning data (operation S150). The combustion model according to an exemplary embodiment may be generated based on at least one of the parametric model including the transfer function model and the state space model and the nonparametric model as shown in Table 1. The combustion model design algorithm 310 may derive the combustion model by using at least one of the optimization algorithms as shown in Table 2 by applying the learning data to at least one of the parametric model and the nonparametric model. This combustion model is configured to predict factors such as the power generation output, the combustion state including the temperature of the steam and the exhaust gas, the composition of the exhaust gas (e.g., carbon monoxide, nitrogen oxide), and the residual oxygen amount after the combustion, which are important variables for combustion, based on the input such as fuel input amount, air input amount, water input amount, and air temperature.

Next, the combustion controller design algorithm 320 of the model layer 300 derives the combustion controller based on the learning data (operation S160). The designed combustion controller serves to produce the target value for the optimal combustion control. The combustion model is used to produce the optimal target value.

Next, the optimal model/controller selector 410 of the optimal layer 400 selects the optimum combustion model and combustion controller among the plurality of combustion models and combustion controllers previously generated based on the analysis result of the currently measured real-time data (operation S170).

The optimal model/controller selector 410 selects the combustion model by analyzing the real-time data (operation S170). Here, the optimal model/controller selector 410 selects the combustion model having the smallest residual, for example, the difference between the currently measured real-time data for the boiler combustion and estimation data estimated through the combustion model among the plurality of combustion models. Thereafter, the optimal model/controller selector 410 selects the combustion controller based on the selected combustion model.

Further, the combustion optimization algorithm 420 of the optimal layer 400 calculates the optimal target value for the combustion optimization by inputting the currently measured real-time data to the previously selected combustion model and combustion controller (operation S180). At this time, the combustion optimization algorithm 420 may calculate the control target value and the auxiliary value associated therewith.

Figure 3:
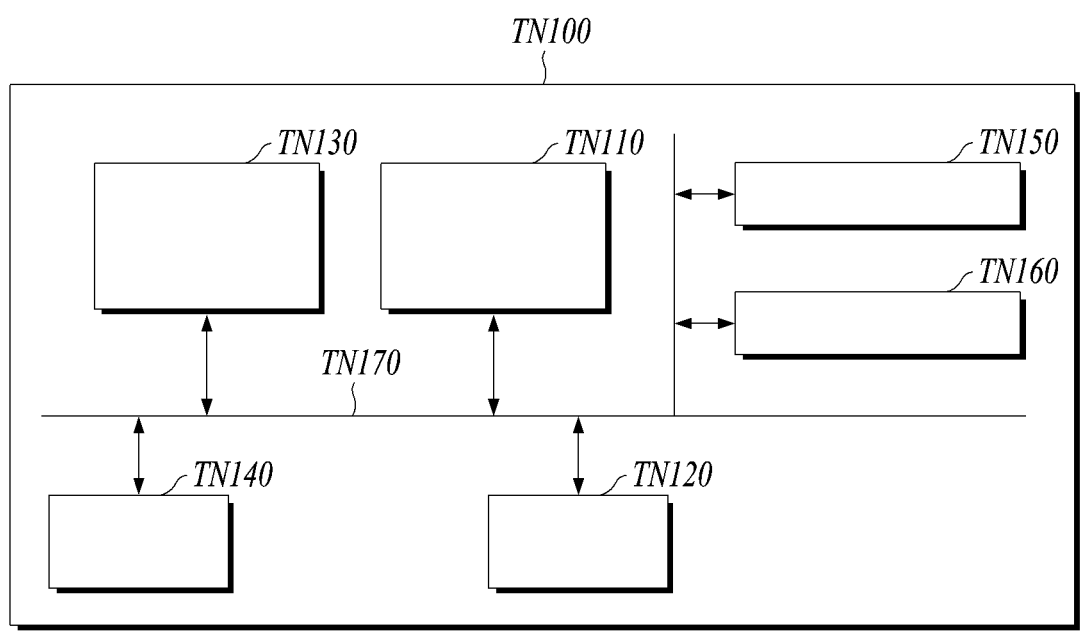
FIG. 3 is a diagram showing a computing apparatus according to an exemplary embodiment.

FIG. 3 is a diagram showing a computing apparatus according to an exemplary embodiment. The computing apparatus TN100 of FIG. 3 may be an apparatus described in the present disclosure (e.g., a combustion optimization apparatus, etc.).

Referring to FIG. 3, the computing apparatus TN100 may include at least one processor TN110, a transceiver TN120, and a memory TN130. The computing apparatus TN100 may further include a storage TN140, an input interface TN150, an output interface TN160, etc. The components included in the computing apparatus TN100 may be connected by a bus TN170 to perform the communication therebetween.

The processor TN110 may execute a program command stored in at least one of the memory TN130 and the storage TN140. The processor TN110 may include a central processing unit (CPU), a graphics processing unit (GPU), or a dedicated processor on which methods according to an exemplary embodiment are performed. The processor TN110 may be configured to implement the procedures, functions, methods, etc. described in connection with an exemplary embodiment. The processor TN110 may control each component of the computing apparatus TN100.

Each of the memory TN130 and the storage TN140 may store various information related to the operation of the processor TN110. Each of the memory TN130 and the storage TN140 may be composed of at least one of a volatile storage medium and a nonvolatile storage medium. For example, the memory TN130 may be composed of at least one of a read only memory (ROM) and a random access memory (RAM).

The transceiver TN120 may transmit or receive a wired signal or a wireless signal. The transceiver TN120 may be connected to a network to perform communication.

Meanwhile, various methods according to an exemplary embodiment described above may be implemented in the form of the readable program through various computer means to be recorded in a computer-readable recording medium. Here, the recording medium may include program commands, data files, data structures, etc. alone or in combination. The program command recorded on the recording medium may be those specially designed and configured for an exemplary embodiment or may also be known and available to those skilled in the art of computer software. For example, the recording medium may include a magnetic media such as a hard disk, a floppy disk, and a magnetic tape, an optical media such as a CD-ROM and a DVD, a magneto-optical media such as a floptical disk, and hardware apparatuses that are specially configured to store and execute the program command such as a ROM, a RAM, and a flash memory. Examples of the program command may include not only machine language wires such as those produced by a compiler, but also high-level language wires that may be executed by a computer by using an interpreter or the like. Such a hardware apparatus may be configured to operate as one or more software modules in order to perform the operation of an exemplary embodiment, and vice versa.

While one or more exemplary embodiments have been described with reference to the accompanying drawings, it is to be understood by those skilled in the art that various modifications and changes in form and details may be made therein without departing from the spirit and scope as defined by the appended claims. Accordingly, the description of the exemplary embodiments should be construed in a descriptive sense only and not to limit the scope of the claims, and many alternatives, modifications, and variations will be apparent to those skilled in the art.

What is claimed is:

1. An apparatus for combustion optimization, comprising:
a management layer configured to collect currently measured real-time data for boiler combustion, and to determine whether to perform combustion optimization and whether to tune a combustion model and a combustion controller by analyzing the collected real-time data;
a data layer configured to derive learning data necessary for designing the combustion model and the combustion controller from the real-time data and previously measured past data for the boiler combustion, wherein the data layer further comprises
a data pre-processor configured to perform pre-processing for data comprising the real-time data and the past data, and
a data analyzer configured to derive the learning data from the pre-processed data for designing the combustion model and the combustion controller based on analyzing a correlation between the pre-processed data using tags of the pre-processed data, and then selecting input data whose correlation degree with respect to output data of the combustion model is greater than or equal to a predetermined value, wherein the input data for analyzing the correlation comprises fuel input amount, air input amount, water input amount, and air temperature and the output data of the combustion model for analyzing the correlation comprises power output, temperature of steam and exhaust gas, composition of exhaust gas, and residual oxygen amount after combustion;
a model layer configured to generate the combustion model and the combustion controller through the learning data; and
an optimal layer configured to calculate a target value for the combustion optimization by using the combustion model and the combustion controller, and to output a control signal according to the calculated target value.

2. The apparatus for combustion optimization of claim 1, wherein the management layer comprises
a combustion management configured to collect the real-time data, and to determine whether to perform the combustion optimization by analyzing the collected real-time data; and
an auto-tuning management configured to determine whether to tune the combustion model and the combustion controller based on the analysis result.

3. The apparatus for combustion optimization of claim 1, wherein the data pre-processor performs at least one of
a signal restoration that restores missing data,
a filtering that filters data satisfying a predetermined condition based on base knowledge or data, and
an outlier processing that erases data that exceeds an upper limit value or falls below a lower limit value.

4. The apparatus for combustion optimization of claim 1, wherein the model layer comprises
a combustion model design algorithm configured to generate the combustion model based on the learning data; and
a combustion controller design algorithm configured to generate the combustion controller based on the learning data.

5. The apparatus for combustion optimization of claim 1, wherein the optimal layer comprises
an optimal model/controller selector configured to select the combustion model and the combustion controller that best match according to a predetermined rule among a plurality of combustion models and combustion controllers by analyzing the real-time data; and
a combustion optimization algorithm configured to derive a control target value through the selected combustion model and combustion controller.

6. The apparatus for combustion optimization of claim 5, wherein the optimal model/controller selector selects the combustion model having the smallest difference between the currently measured real-time data for the boiler combustion and estimation data estimated through the combustion model among the plurality of combustion models.

7. An apparatus for combustion optimization, comprising:
a data layer configured to derive learning data necessary for designing a combustion model and a combustion controller from currently measured real-time data for boiler combustion and previously measured past data for the boiler combustion, wherein the data layer further comprises
a data pre-processor configured to perform pre-processing for data comprising the real-time data and the past data, and
a data analyzer configured to derive the learning data from the pre-processed data for designing the combustion model and the combustion controller based on analyzing a correlation between the pre-processed data using tags of the pre-processed data, and then selecting input data whose correlation degree with respect to output data of the combustion model is greater than or equal to a predetermined value, wherein the input data for analyzing the correlation comprises fuel input amount, air input amount, water input amount, and air temperature and the output data of the combustion model for analyzing the correlation comprises power output, temperature of steam and exhaust gas, composition of exhaust gas, and residual oxygen amount after combustion;
a model layer configured to generate the combustion model and the combustion controller through the learning data; and
an optimal layer configured to select any one combustion model among a plurality of combustion models by analyzing the real-time data, to calculate a target value for the combustion optimization by using the selected combustion controller after selecting any one combustion controller among a plurality of combustion controllers based on the selected combustion model, and to output a control signal according to the calculated target value.

8. The apparatus for combustion optimization of claim 7, wherein the data pre-processor performs at least one of
a signal restoration that restores missing data,
a filtering that filters data satisfying a predetermined condition based on base knowledge or data, and
an outlier processing that erases data that exceeds an upper limit value or falls below a lower limit value.

9. The apparatus for combustion optimization of claim 7, wherein the model layer comprises
a combustion model design algorithm configured to generate the combustion model based on the learning data; and
a combustion controller design algorithm configured to generate the combustion controller based on the learning data.

10. The apparatus for combustion optimization of claim 7, wherein the optimal layer comprises
an optimal model/controller selector configured to select the combustion model and the combustion controller that best match according to a predetermined rule among a plurality of combustion models and combustion controllers by analyzing the real-time data; and
a combustion optimization algorithm configured to derive a control target value through the selected combustion model and combustion controller.

11. The apparatus for combustion optimization of claim 10,
wherein the optimal model/controller selector selects the combustion model having the smallest difference between the currently measured real-time data for the boiler combustion and estimation data estimated through the combustion model among the plurality of combustion models.

12. A method for optimizing combustion, comprising:
collecting, by a management layer, currently measured real-time data for boiler combustion, and determining whether to tune a combustion model and a combustion controller by analyzing the collected real-time data;
deriving, by a data layer, learning data from the real-time data and previously measured past data for the boiler combustion in response to determining that the management layer determines to tune, wherein the deriving of the learning data further comprises
pre-processing, by a data pre-processor of the data layer, data comprising the real-time data and the previously measured past data, and
deriving, by a data analyzer of the data layer, the learning data necessary for designing the combustion model and the combustion controller based on analyzing a correlation between the pre-processed data using tags of the pre-processed data, and then selecting input data whose correlation degree with respect to output data of the combustion model is greater than or equal to a predetermined value, wherein the input data for analyzing the correlation comprises fuel input amount, air input amount, water input amount, and air temperature and the output data of the combustion model for analyzing the correlation comprises power output, temperature of steam and exhaust gas, composition of exhaust gas, and residual oxygen amount after combustion;
generating, by a model layer, the combustion model and the combustion controller by using the learning data;
calculating, by an optimal layer, a target value for combustion optimization through the selected combustion model and combustion controller among a plurality of combustion models and combustion controllers comprising the generated combustion model and combustion controller; and
outputting, by the optimal layer, a control signal according to the calculated target value.

13. The method for optimizing combustion of claim 12, wherein the pre-processing comprises performing, by the data pre-processor, at least one of
signal restoration that restores missing data,
a filtering that filters data satisfying a predetermined condition based on base knowledge or data, and
an outlier processing that erases data that exceeds an upper limit value or falls below a lower limit value.

14. The method for optimizing combustion of claim 12, wherein the generating the combustion model and the combustion controller comprises
generating, by a combustion model design algorithm of the model layer, the combustion model based on the learning data; and
generating, by a combustion controller design algorithm of the model layer, the combustion controller based on the learning data.

15. The method for optimizing combustion of claim 12, wherein the calculating the target value for the combustion optimization comprises
selecting, by an optimal model/controller selector of the optimal layer, the combustion model by analyzing the real-time data;
selecting, by the optimal model/controller selector, the combustion controller based on the selected combustion model; and
deriving, by a combustion optimization algorithm of the optimal layer, a control target value through the selected combustion model and the selected combustion controller.

16. The method for optimizing combustion of claim 15, wherein the selecting the combustion model comprises selecting the combustion model having the smallest difference between the currently measured real-time data for the boiler combustion and estimation data estimated through the combustion model among the plurality of combustion models.

17. The method for optimizing combustion of claim 12, further comprising,
after the determining whether to tune,
in response to determining that the management layer determines not to tune,
calculating, by the optimal layer, the target value for the combustion optimization through the combustion model and the combustion controller selected from the plurality of combustion models and combustion controllers previously stored; and
outputting, by the optimal layer, the control signal according to the calculated target value.

* * * * *